United States Patent
Tabata (10) Patent No.: US 12,479,180 B2
(45) Date of Patent: Nov. 25, 2025

(54) PRESS DEVICE

(71) Applicant: SUMITOMO HEAVY INDUSTRIES, LTD., Tokyo (JP)

(72) Inventor: Satoshi Tabata, Ehime (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 503 days.

(21) Appl. No.: 17/559,373

(22) Filed: Dec. 22, 2021

(65) Prior Publication Data

US 2022/0203642 A1     Jun. 30, 2022

(30) Foreign Application Priority Data

Dec. 24, 2020   (JP) ................................. 2020-214597

(51) Int. Cl.
| | |
|---|---|
| *B30B 1/26* | (2006.01) |
| *B30B 1/18* | (2006.01) |
| *B30B 15/14* | (2006.01) |
| *B30B 15/18* | (2006.01) |
| *B30B 15/22* | (2006.01) |

(52) U.S. Cl.
CPC ................ *B30B 1/26* (2013.01); *B30B 1/181* (2013.01); *B30B 15/148* (2013.01); *B30B 15/18* (2013.01); *B30B 15/22* (2013.01)

(58) Field of Classification Search
CPC .. B30B 1/26; B30B 1/181; B30B 7/02; B30B 11/007; B30B 15/02; B30B 15/148; B30B 15/18; B30B 15/22; B30B 15/0029; B30B 15/26; B21J 9/18; B21J 9/14
USPC ....................................................... 100/264
See application file for complete search history.

(56) References Cited

U.S. PATENT DOCUMENTS 4,084,932 A * 4/1978 Morris ................. B30B 11/001
                                                      425/405.2
2002/0029670 A1* 3/2002 Long ....................... B26D 7/26
                                                      83/522.18

FOREIGN PATENT DOCUMENTS

| CN | 105711135 A | * | 6/2016 | ............. B30B 15/02 |
|---|---|---|---|---|
| EP | 2818310 A1 | * | 12/2014 | ........... B21D 45/003 |
| EP | 3100799 A1 | * | 12/2016 | ............. B21D 24/02 |
| JP | H0825098 A | * | 1/1966 | ............. B30B 15/04 |
| JP | 2000254799 A | * | 9/2000 | ............. B30B 1/186 |
| JP | 2008114236 A | * | 5/2008 | ............. B30B 15/10 |
| JP | 2014113601 A | * | 6/2014 | ........... B21D 22/022 |
| JP | 2018-114525 A | | 7/2018 | |
| WO | WO-2013026137 A1 | * | 2/2013 | ........... B21D 22/208 |

OTHER PUBLICATIONS

Machine translation of JP 2008114236-A—12 pages (Year: 2025).*
Machine translation of JP 2014113601-A—4 pages (Year: 2025).*

* cited by examiner

*Primary Examiner* — Jimmy T Nguyen
(74) *Attorney, Agent, or Firm* — Michael Best & Friedrich LLP (57) ABSTRACT

A press device includes a slide configured to hold a first die, a holding portion configured to hold a second die, a reciprocating mechanism that causes the slide to reciprocate in a stroke direction in which the first die and the second die move closer to or away from each other, and a pressurizing mechanism that holds the second die while pressurizing the second die toward the first die with a stroke shorter than that of the reciprocating mechanism in a state where the first die and the second die are moved close to each other by the reciprocating mechanism.

18 Claims, 4 Drawing Sheets

PRESS OPERATION AND SWITCHING TIMING

FIG. 3

| No. | CRANK MECHANISM | | | HYDRAULIC CYLINDER | |
|---|---|---|---|---|---|
| | STATE | OPERATION | | STATE | OPERATION |
| 1 | STOP AT TOP DEAD CENTER | MAIN MOTOR ACTUATION | FLYWHEEL ROTATION | DESCENDING END (STOP) | STOP |
| 2 | ACTUATION (DESCENDING) | BRAKE OPENING | CLUTCH CLOSING | ↓ | ↓ |
| 3 | BOTTOM DEAD CENTER (STOP) | BRAKE CLOSING | CLUTCH OPENING | ASCENDING ACTUATION | PRESSURIZING MECHANISM ASCENDING AND PRESSURIZING |
| 4 | ↓ | ↓ | ↓ | PRESSURIZED STATE MAINTAINING | PRESSURIZING MECHANISM ASCENDING AND HOLDING |
| 5 | ↓ | ↓ | ↓ | DESCENDING ACTUATION | PRESSURIZING MECHANISM DESCENDING |
| 6 | ACTUATION (ASCENDING) | BRAKE OPENING | CLUTCH CLOSING | ↓ | ↓ |
| 7 | ↓ | ↓ | ↓ | DESCENDING END (STOP) | STOP |
| 8 | STOP AT TOP DEAD CENTER | BRAKE CLOSING | CLUTCH OPENING | ↓ | ↓ |

PRESS DEVICE

RELATED APPLICATIONS

The content of Japanese Patent Application No. 2020-214597, on the basis of which priority benefits are claimed in an accompanying application data sheet, is in its entirety incorporated herein by reference.

BACKGROUND

Technical Field

Certain embodiments of the present invention relate to a press device.

Description of Related Art

In a press device, a crank mechanism is generally used as a mechanism that performs a stroke operation of a slide that holds a die (for example, refer to the related art).

SUMMARY

According to an embodiment of the present invention, there is provided a press device including a slide configured to hold a first die, a holding portion configured to hold a second die, a reciprocating mechanism that causes the slide to reciprocate in a stroke direction in which the first die and the second die move closer to or away from each other, and a pressurizing mechanism that holds the second die while pressurizing the second die toward the first die with a stroke shorter than that of the reciprocating mechanism in a state where the first die and the second die are moved close to each other by the reciprocating mechanism.

DETAILED DESCRIPTION

However, although a crank mechanism can perform press molding in a high cycle, the crank mechanism pressurizes a forming object when an upper die passes a bottom dead center. Accordingly, it is necessary to properly adjust an interval between the upper die and a lower die. However, it is extremely difficult to adjust a pressurizing force to a target pressurizing force.

In addition, in a case of the crank mechanism, it is difficult to maintain a pressurized state. For example, when a servo motor is used as a drive source, a slide can be stopped at a pressurizing position for a fixed time. However, when the slide stops in the pressurized state, a great holding torque is required. Therefore, there is a disadvantage in that the servomotor having large capacity and high torques is required.

It is desirable to perform press molding using proper pressurizing.

According to an embodiment of the present invention, it is possible to perform press molding using more proper pressurizing.

Hereinafter, embodiments according to the present invention will be described in detail with reference to the drawings.

Configuration of Molding Device

Figure 1:
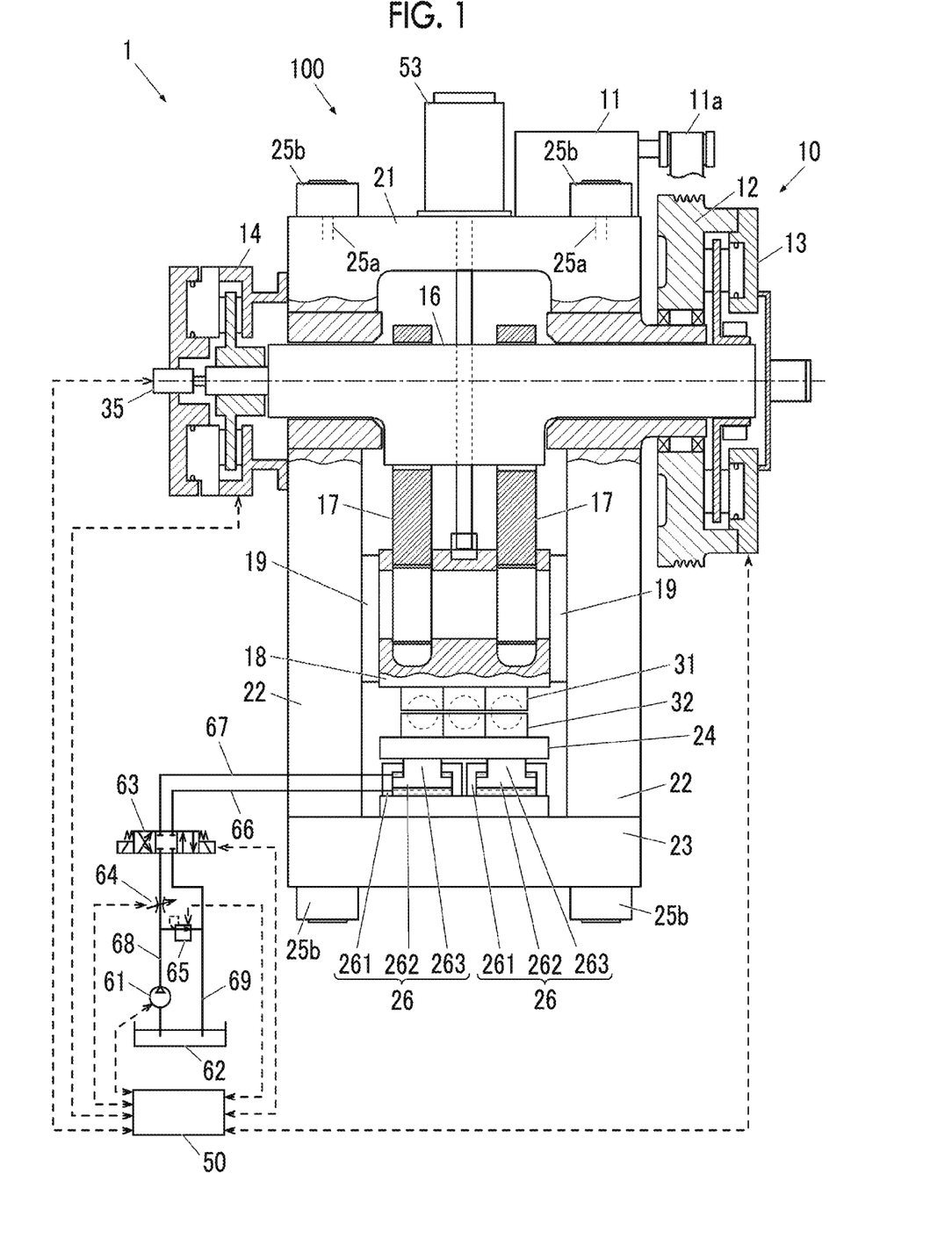
FIG. 1 is a view illustrating an overall configuration of a press device according to the present embodiment.

FIG. 1 is a view illustrating an overall configuration of a press device 1 serving as a molding device according to the present embodiment.

As illustrated in the drawing, the press device 1 is a forging press device that performs forging molding, and includes a device main body 100 and a control device 50 (to be described later). The device main body 100 includes a bed 23, a plurality of uprights 22, a crown 21, a bolster 24, a slide 18, a drive unit 10, a movement amount measuring instrument 35 serving as a position detection unit, a balancer 53, and a hydraulic cylinder mechanism 26 serving as a pressurizing mechanism.

The bed 23, the plurality of uprights 22, and the crown 21 form a frame unit of the press device 1. A tie rod 25a is inserted into the bed 23, the plurality of uprights 22, and the crown 21, and is tightened by a tie rod nut 25b so that the bed 23, the plurality of uprights 22, and the crown 21 are fastened to each other.

The bolster 24 is fixed onto the bed 23 via the hydraulic cylinder mechanism. 26, and holds a plurality of lower dies 32 serving as second dies on an upper portion thereof. The bolster 24 functions as a holding portion of the lower die 32.

The slide 18 is supported by a guide 19 provided in the upright 22 so that a reciprocating operation can be performed in an upward-downward direction as a stroke direction. Upper dies 31 serving as first dies as many as the lower dies 32 are held in a lower portion of the slide 18. The plurality of upper dies 31 serving as the dies and the plurality of lower dies 32 serving as the dies form a set corresponding to each other, and are respectively arrayed along a longitudinal direction (rightward-leftward direction in the drawing) of an eccentric shaft 16 (to be described later). The upper die 31 and the lower die 32 face each other in the upward-downward direction. When the slide 18 ascends, the upper die 31 and the lower die 32 are separated from each other. In a state where the slide 18 descends so that the upper die 31 and the lower die 32 are moved closest to each other, a forming object can be pressurized and held. In the above-described slide 18, a position where the slide 18 ascends to the maximum is defined as a top dead center (first position), and a position where the slide 18 descends to the maximum is defined as a bottom dead center (second position).

The stroke direction of the slide 18 is not limited to the upward-downward direction. In the present embodiment, a case where the stroke direction is the upward-downward direction will be described as an example.

The drive unit 10 is configured to cause the slide 18 to reciprocate in the stroke direction, and includes a motor 11, a flywheel 12, a clutch 13, a brake 14, an eccentric shaft 16, and a connecting rod (connecting rod) 17. All of these form a crank mechanism serving as a reciprocating mechanism.

The motor 11 is connected to the flywheel 12 via a belt 11a, and the flywheel 12 is rotated by power of the motor 11. Although the motor 11 can control a rotation speed, the motor 11 does not have a positioning function for stopping a shaft angle at any desired position, unlike a so-called servo motor. However, the servo motor may be applied to the motor 11. In this case, the flywheel 12, the clutch 13, and the brake 14 can be no longer required.

The clutch 13 switches connection and disconnection between the flywheel 12 and the eccentric shaft 16. The brake 14 brakes the eccentric shaft 16. When the flywheel 12 and the eccentric shaft 16 are connected to each other by the clutch 13, a rotational motion of the flywheel 12 is transmitted to the eccentric shaft 16. Thereafter, the rotational motion is converted into a linear motion of the slide 18 via the connecting rod 17. The slide 18 reciprocates along the upward-downward direction.

The movement amount measuring instrument 35 is used for detecting a position in a trajectory of a reciprocating operation of the slide 18 in the upward-downward direction (hereinafter, referred to as a "slide position"). For example, the movement amount measuring instrument 35 is configured to include a detector such as an encoder that detects a rotation angle of the eccentric shaft 16.

In addition, for example, the movement amount measuring instrument 35 may be provided in a frame unit to measure a movement amount of the slide 18. In this case, the movement amount measuring instrument 35 may be configured to include a rack provided on the slide 18 side, a pinion provided on the upright 22 or the guide 19 side, and a detector such as an encoder that detects a rotation amount of the pinion. Alternatively, the movement amount measuring instrument 35 may be configured to include any detector that can detect a position in a linear direction, such as a linear sensor that detects positional displacement of the slide 18 in the upward-downward direction, and a laser detector that detects a position of the slide 18 in the upward-downward direction by using optical distance measurement.

The balancer 53 is an air cylinder provided to apply an upward pressure corresponding to a weight of the slide 18 to a movement of the slide 18 in the stroke direction (upward-downward direction).

In the balancer 53, a piston rod connected to a piston extends downward, and a lower end portion thereof is connected to an upper end portion of the slide 18. The balancer 53 is configured as follows. A supporting pressure to support the slide 18 from above is applied so that a gap with the connecting rod 17 that supports the slide 18 moves close to one side to remove influence of the gap.

Hydraulic Cylinder Mechanism

Every two of four hydraulic cylinder mechanisms 26 in total are provided in a forward-rearward direction and the rightward-leftward direction, between the bolster 24 and the bed 23. The number of the hydraulic cylinder mechanisms 26 can be increased or decreased as appropriate.

The hydraulic cylinder mechanism 26 includes a cylinder 261 fixed to and supported by an upper surface of the bed 23, and a piston 262 accommodated inside the cylinder 261 to be movable in the stroke direction (upward-downward direction). The hydraulic cylinder mechanism 26 is a double acting type cylinder in which hydraulic oil serving as a working fluid is supplied to and discharged from an upper region and a lower region of the piston 262 inside the cylinder 261.

The piston rod 263 connected to the piston 262 extends upward, and an upper end portion thereof is fixed and connected to a lower surface of the bolster 24. The piston rod 263 of the hydraulic cylinder mechanism 26 is configured so that the stroke direction coincides with that of the slide 18. However, a movable range (stroke) of the bolster 24 is set to be sufficiently shorter than the stroke of the slide 18. However, the hydraulic cylinder mechanism 26 includes a stroke that enables the lower die 32 on the bolster 24 to sufficiently pressurize the forming object with respect to the upper die 31 when the slide 18 is located at the bottom dead center.

In this manner, when the slide 18 is located at the bottom dead center, the hydraulic cylinder mechanism 26 can push the bolster 24 and the lower die 32 upward with respect to the upper die 31, and can perform the pressurizing and holding operation to maintain a pressurized state for a fixed period of time.

Each of the hydraulic cylinder mechanisms 26 is connected to a hydraulic circuit illustrated in FIG. 1. Although FIG. 1 illustrates a state where only one hydraulic cylinder mechanism 26 is connected to the hydraulic circuit, all of the hydraulic cylinder mechanisms 26 are actually connected to the hydraulic circuit in the same manner. All of the hydraulic cylinder mechanisms 26 are uniformly operated by the hydraulic circuit.

The hydraulic circuit includes a pump 61 for supplying the hydraulic oil, a hydraulic oil tank 62, a direction switching valve 63, a flow rate adjustment valve 64, a pressure control valve 65, a first flow path 66, and a second flow path 67, a third flow path 68, and an oil drainage path 69.

The first flow path 66 is a flow path through which the hydraulic oil is circulated between the lower region of the hydraulic cylinder mechanism 26 and the direction switching valve 63.

The second flow path 67 is a flow path through which the hydraulic oil is circulated between the upper region of the hydraulic cylinder mechanism 26 and the direction switching valve 63.

The third flow path 68 is a flow path through which the hydraulic oil is circulated between the pump 61 and the direction switching valve 63.

The oil drainage path 69 is a flow path through which the hydraulic oil is circulated between the direction switching valve 63 and the hydraulic oil tank 62.

The flow rate adjustment valve 64 is provided in the third flow path 68, and the pressure control valve 65 is provided on the flow path that connects the third flow path 68 and the oil drainage path 69 to each other.

The direction switching valve 63 can switch a state where the first flow path 66 and the third flow path 68 are connected and the second flow path 67 and the oil drainage path 69 are connected, a state where the first flow path 66 and the oil drainage path 69 are connected and the second flow path 67 and the third flow path 68 are connected, and a closed state where all of the flow paths are closed.

The flow rate adjustment valve 64 adjusts a flow rate of the hydraulic oil supplied from the pump 61, and the pressure control valve 65 adjusts a supply pressure of the hydraulic oil supplied from the pump 61.

When the direction switching valve 63 is switched, the hydraulic oil can be supplied to either the upper region or the lower region of the hydraulic cylinder mechanism 26 at an adjusted flow rate and an adjusted supply pressure, and the hydraulic oil can return to the hydraulic oil tank 62 from the other side of the upper region or the lower region.

The flow rate adjustment valve 64, the pressure control valve 65, the direction switching valve 63, and the pump 61 are controlled by the control device 50. For example, the direction switching valve 63 brings the first flow path 66 and the third flow path 68, and the second flow path 67 and the oil drainage path 69 into a connection state. In this manner, the hydraulic oil can be supplied to the lower region of the hydraulic cylinder mechanism 26 at a target pressure, and the lower die 32 can be pressurized to the upper die 31 side through the bolster 24.

Operation Control for Press Molding

The control device 50 causes the movement amount measuring instrument 35 of the device main body 100 to detect a position of the slide 18, based on a detected shaft angle of the eccentric shaft 16.

In addition, the control device 50 is connected to the motor 11 of the drive unit 10, the clutch 13, the brake 14, the pump 61 of the hydraulic circuit, the direction switching valve 63, the flow rate adjustment valve 64, and the pressure control valve 65, and controls all of these to perform press molding.

Operation control performed by the control device 50 during the press molding of the press device 1 will be described.

Figure 2:
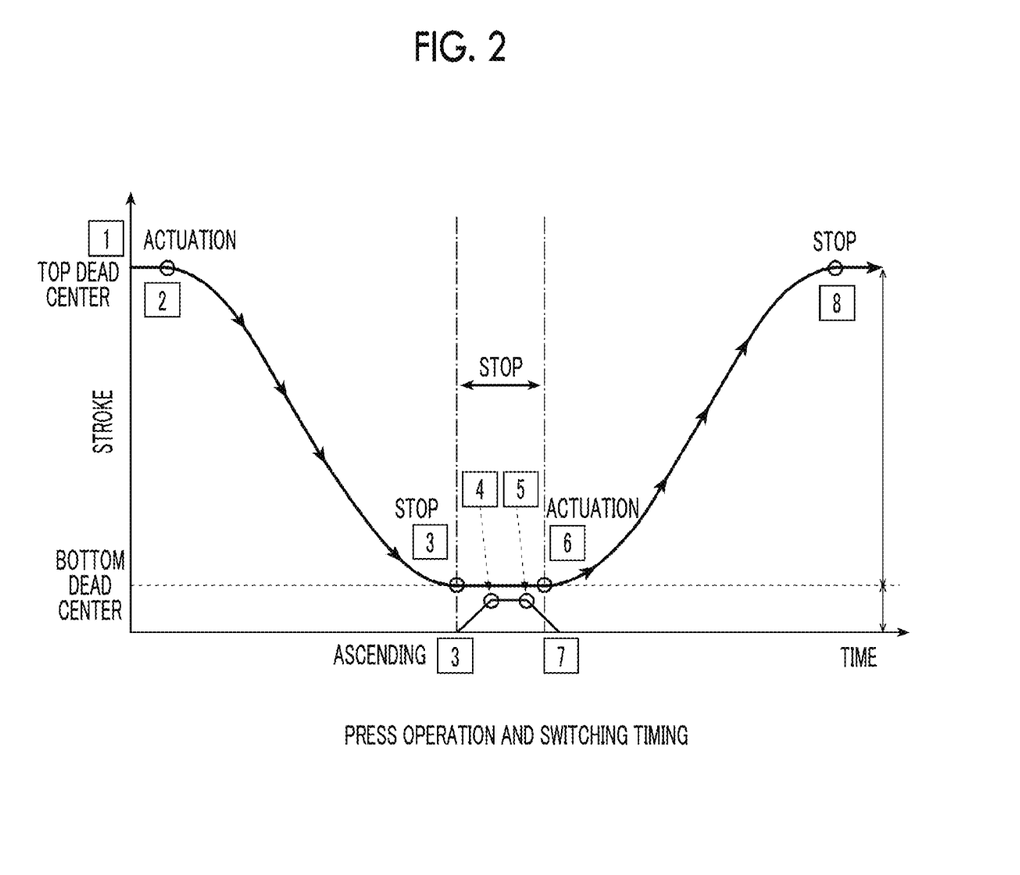
FIG. 2 is an operation flow graph illustrating a time-dependent positional change in a slide and a bolster while one stroke is operated during press molding.

FIG. 2 is an operation flow graph illustrating a time-dependent positional change in the slide 18 (upper die 31) and the bolster 24 (lower die 32) in one stroke operation during the press molding. A vertical axis represents positions, and a horizontal axis represents times. In addition, FIG. 3 is a view illustrating a control operation performed by the drive unit 10 (crank mechanism) and the control device 50 of the hydraulic cylinder mechanism 26 at each position of the slide 18 or the bolster 24 illustrated in FIG. 2.

The control device 50 performs the following operation control, while acquiring the position of the slide 18 from an output of the movement amount measuring instrument 35.

Figure 3:
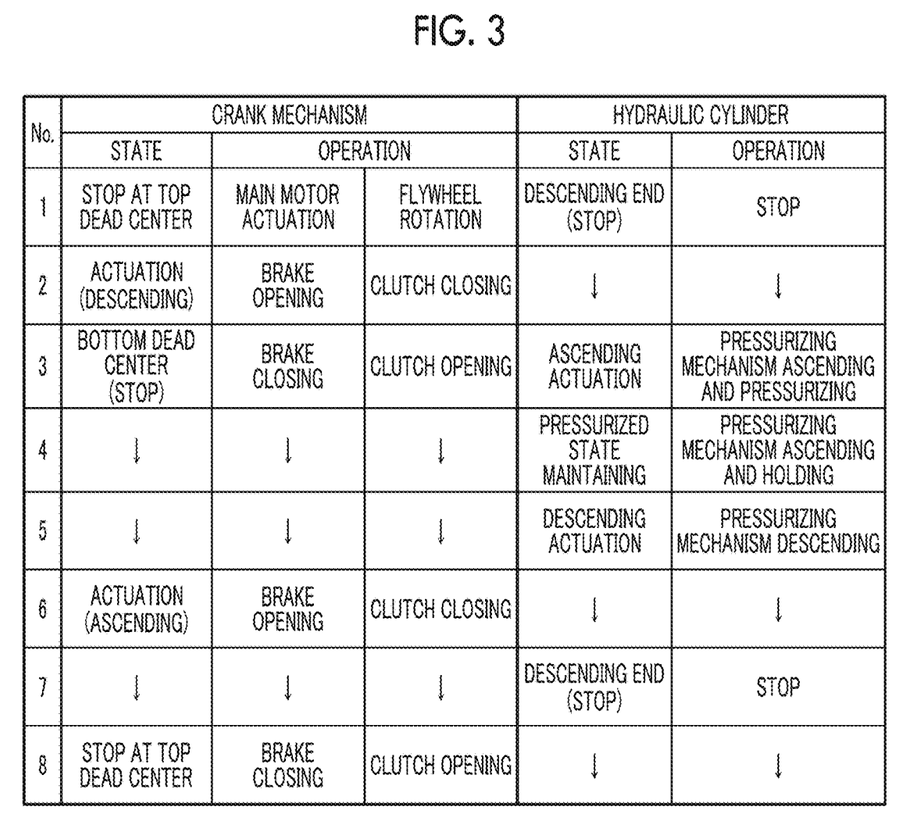
FIG. 3 is a view illustrating a control operation performed by a control device of each unit at each position of the slide or the bolster illustrated in FIG. 2.

As illustrated in FIGS. 2 and 3, in State 1, the control device 50 rotationally drives the flywheel 12 by using the motor 11. In this case, the clutch 13 is opened, and no torque is applied to the eccentric shaft 16. The brake 14 is closed, and the eccentric shaft 16 is controlled to be in a braking state.

On the other hand, the hydraulic circuit is controlled to maintain a state where the hydraulic oil in the lower region of each of the hydraulic cylinder mechanisms 26 returns to the hydraulic oil tank 62.

Therefore, the slide 18 stands by at a top dead center position, and the bolster 24 and the lower die 32 are located at a descending end to which the bolster 24 and the lower die 32 descend to the maximum.

In State 2, the control device 50 closes the clutch 13, opens the brake 14, and rotates the eccentric shaft 16. In this manner, the slide 18 is actuated, and starts descending from the top dead center.

The bolster 24 and the lower die 32 stand by at the descending end.

In State 3, when the movement amount measuring instrument 35 detects that the slide 18 reaches the bottom dead center, the control device 50 opens the clutch 13, closes the brake 14, and stops the slide 18 at the bottom dead center.

Furthermore, the control device 50 starts control to supply the hydraulic oil to the hydraulic circuit at a target pressure for pressurizing the lower region of each of the hydraulic cylinder mechanisms 26.

Therefore, the slide 18 stops at the bottom dead center position, and the bolster 24 and the lower die 32 start to ascend.

When the forming object starts to be pressurized by the lower die 32 with respect to the upper die 31 after the slide 18 stops at the bottom dead center, the bolster 24 may start ascending earlier.

In State 4, the upper die 31 of the slide 18 stopping at the bottom dead center and the lower die 32 on the ascending bolster 24 move closest to each other, and the forming object starts to be pressurized.

In this case, the control device 50 continues to control the hydraulic circuit so that the bolster 24 and the lower die 32 ascend at the target pressure. In this manner, the lower die 32 continues a pressurized state while maintaining the target pressure, and the forming object is pressurized and held.

In this case, the brake 14 functions as a slide holding mechanism that holds the position of the slide 18 while the hydraulic cylinder mechanism 26 holds and pressurizes and holds the forming object.

In addition, when a servo motor is used as the motor 11, the servo motor may function as a slide holding mechanism that holds the position of the slide 18.

In addition, in a case of a configuration including both the servo motor and the brake 14, the press device 1 may be provided with a setting unit for selecting whether to use either the servomotor or the brake 14, or whether to use both of these as the slide holding mechanism.

In State 5, when a pressurized and held state continues for a predetermined fixed time by measuring an elapsed time from when the bolster 24 starts to ascend, the control device 50 controls the hydraulic circuit so that the hydraulic oil in the lower region of each of the hydraulic cylinder mechanism 26 returns to the hydraulic oil tank 62. In this manner, the bolster 24 and the lower die 32 start to descend, and the pressurized and held state of the forming object is released.

In State 6, when the predetermined fixed time elapses after the pressurized and held state is released, the control device 50 closes the clutch 13, opens the brake 14, and rotates the eccentric shaft 16. In this manner, the slide 18 starts to ascend from the bottom dead center.

In State 7, the bolster 24 and the lower die 32 reach the descending end, and stop descending.

In State 8, when the movement amount measuring instrument 35 detects that the slide 18 reaches the top dead center, the control device 50 opens the clutch 13, closes the brake 14, and stops the slide 18 at the top dead center. On the other hand, the bolster 24 and the lower die 32 stand by at the descending end.

State 8 coincides with State 1 described above, and when a subsequent stroke of press molding starts, State 8 (State 1) is shifted to State 2, the press molding operation is performed in the same manner.

Technical Effects of Present Embodiment

As described above, the press device 1 includes the drive unit 10 that causes the slide 18 to perform the reciprocating operation in the stroke direction in which the upper die 31 and the lower die 32 move closer to or away from each other, and the hydraulic cylinder mechanism 26 that holds the bolster 24 and the lower die 32 while pressurizing the bolster 24 and the lower die 32 toward the upper die 31 with a stroke shorter than that of the slide 18.

Therefore, the drive unit 10 and the hydraulic cylinder mechanism 26 can pressurize the upper die 31 and the lower die 32 by moving both of these relatively closer to each other, and can perform the press molding in a high cycle. In addition, in this manner, a relatively large stroke can be achieved between the upper die 31 and the lower die 32. Accordingly, a degree of freedom in die designing of the upper die 31 and the lower die 32 can widely be secured, and press working can be realized in various ways.

In addition, in the hydraulic cylinder mechanism 26 serving as the pressurizing mechanism having a short stroke, a pressurizing force is easily set to a target value, and a constantly pressurized state is easily maintained. Therefore, the pressurizing and holding operation can be performed by using a target pressurizing force. Proper and high quality press working for the forming object can be realized.

In addition, the hydraulic cylinder mechanism 26 is provided as the pressurizing mechanism. Therefore, a servo motor having large capacity and high torques for the pressurizing and holding operation can be no longer required.

Furthermore, instead of the slide 18, the hydraulic cylinder mechanism 26 serving as the pressurizing mechanism is provided on the lower die 32 side. Therefore, a supply path can more easily be installed, compared to a case where the hydraulic oil is supplied to the slide 18 that performs a high speed and large stroke operation. Furthermore, compared to a case where the hydraulic oil is supplied to the slide 18 side, a supply path from which the hydraulic oil is less likely to leak can be installed, and a stable operation of the device can be maintained, or maintenance work for the device can satisfactorily be carried out.

In addition, the drive unit 10 serving as the reciprocating mechanism forms the crank mechanism. Therefore, a large stroke of the upper die 31 can easily be secured, and the press molding can be performed in a high cycle.

Furthermore, the drive unit 10 includes the eccentric shaft 16. Therefore, the plurality of upper dies 31 and lower dies 32 are disposed along the longitudinal direction of the eccentric shaft 16. In this manner, the press molding can be performed on a large number of forming objects at one time. Each of the upper dies 31 and each of the lower dies 32 can evenly be pressurized, and uniform molding quality thereof can be achieved.

In addition, in the drive unit 10, the control device 50 moves the slide 18 to and stops the slide 18 at a position where the hydraulic cylinder mechanism 26 can perform the pressurizing and holding operation, the strokes of the bolster 24 and the lower die 32 of the hydraulic cylinder mechanism 26 can be reduced. A delay caused by the hydraulic cylinder mechanism 26 which is less likely to have the high speed can be minimized. The press molding can be performed in the high cycle while the hydraulic cylinder mechanism 26 is adopted.

In addition, the drive unit 10 causes the slide 18 to descend to and stop at the dead center (bottom dead center) of the stroke operation. Therefore, the pressurizing and holding operation can stably be performed. The target pressurizing force is easily obtained. Proper and high quality press working for the forming object can be carried out.

In particular, the lower die 32 is pressurized against the stopping upper die 31 by the hydraulic cylinder mechanism 26. Therefore, the press working can be carried out by using a more accurate target pressurizing force.

In addition, the slide 18 descends to and stops at the dead center (bottom dead center) of the stroke operation. Therefore, the eccentric shaft 16 can be held not to rotate with a small force with respect to the pressurizing force applied from the hydraulic cylinder mechanism 26 side.

When the pressurizing and holding operation is performed in a stopped state of the slide 18 at the bottom dead center, the bottom dead center of the slide 18 can be maintained with a small holding torque. Therefore, braking capacity of the brake 14 can be reduced, or the brake 14 can be no longer required.

In particular, the slide holding mechanism that holds the position of the slide 18 is provided while the pressurizing and holding operation is performed by the hydraulic cylinder mechanism 26. Accordingly, the pressurizing and holding operation can be performed in a state where a holding force is sufficiently applied to the slide 18. Therefore, the press working can be carried out by using a more accurate target pressurizing force.

In addition, the press device 1 adopts the hydraulic cylinder mechanism 26 serving as the pressurizing mechanism. Therefore, a large pressurizing force can easily be obtained, and the pressurized state can easily be maintained. In addition, the drive unit 10 occupies a major portion of strokes of a relative separation operation between the upper die 31 and the lower die 32. Therefore, the strokes occupied by the hydraulic cylinder mechanism. 26 can be reduced, and a large hydraulic pump can be no longer required.

In addition, the hydraulic cylinder mechanism 26 is configured so that the piston rod pressurizes and holds the lower die 32. Therefore, a simplified structure can be achieved.

Others

Hitherto, the embodiment of the present invention has been described. However, the present invention is not limited to the above-described embodiment.

For example, in the above-described embodiment, a configuration in which the slide 18 reciprocates in the upward-downward direction has been described as an example. However, the present invention is not limited to the press device in which the slide 18 reciprocates in the upward-downward direction. For example, the press device may be configured so that the slide 18 reciprocates in a horizontal direction, the upward-downward direction, or a direction inclined with respect to the horizontal direction.

In addition, in the above-described embodiment, a configuration in which the drive unit 10 stops the slide 18 at the bottom dead center during the pressurizing and holding operation has been described as an example. However, as long as a slide position of the slide 18 falls within a range in which a slide position of the slide 18 is held during the pressurizing and holding operation, the slide position may not be the bottom dead center. However, in view of a relationship with the stroke of the hydraulic cylinder mechanism 26, it is preferable that the stop position of the slide 18 is located around the bottom dead center.

Figure 4:
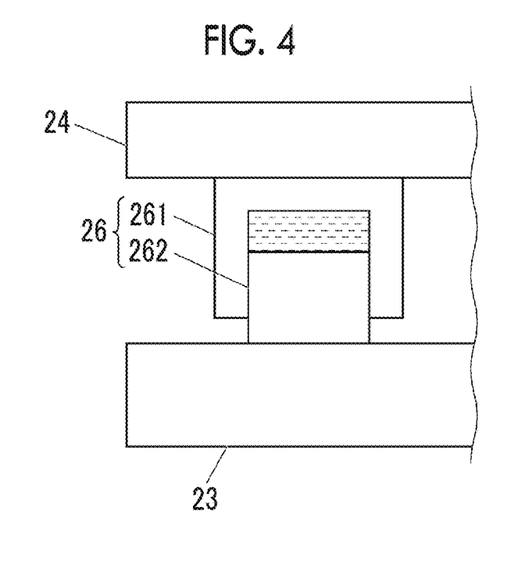
FIG. 4 is a view for describing another configuration of a hydraulic cylinder mechanism.

In addition, the hydraulic cylinder mechanism 26 serving as the pressurizing mechanism is not limited to the above-described structure. For example, as illustrated in FIG. 4, a configuration may be adopted as follows. The piston 262 (or a plunger) is fixed to the upper surface of the bed 23, and the cylinder 261 is fixed to the lower surface of the bolster 24. The cylinder 261 ascends and descends so that the bolster 24 and the lower die 32 are provided with the stroke operation. In addition, as illustrated in FIG. 4, the hydraulic cylinder mechanism 26 may adopt a single-acting cylinder.

In addition, a configuration may be adopted as follows. The hydraulic cylinder mechanism 26 in FIG. 4 is inverted in the upward-downward direction. The cylinder 261 is fixed to the upper surface of the bed 23. The piston 262 is fixed to the lower surface of the bolster 24. The piston 262 ascends and descends so that the bolster 24 and the lower die 32 are provided with the stroke operation.

Furthermore, as the pressurizing mechanism, a hydraulic pressure mechanism using a hydraulic pressure (for example, a water pressure) of a liquid other than the hydraulic oil may be adopted.

In addition, as the pressurizing mechanism, another pressurizing mechanism that can obtain a large pressurizing force in the stroke direction and can easily hold the pressurizing force may be adopted.

Figure 5:
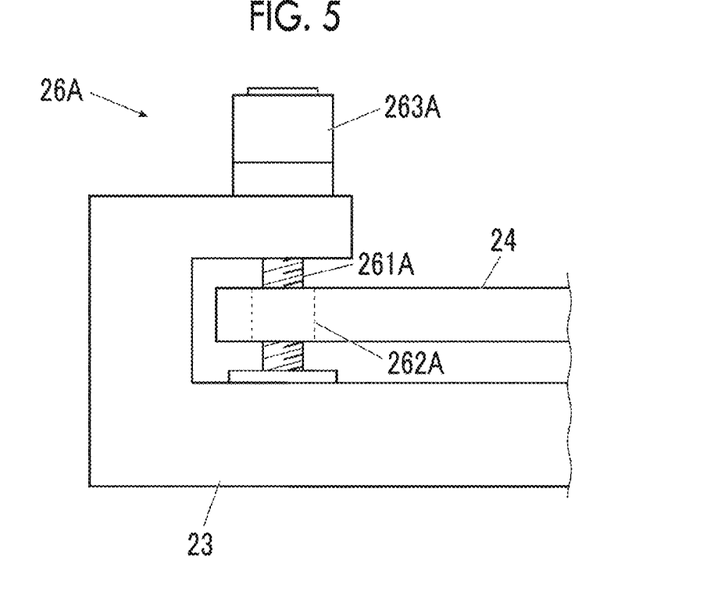
FIG. 5 is a view for describing another configuration of a pressurizing mechanism.

For example, a ball screw mechanism 26A as illustrated in FIG. 5 may be adopted as the pressurizing mechanism.

For example, the ball screw mechanism 26A is configured to include a ball screw shaft 261A supported by the bed 23 to be rotatable in a state along the stroke direction, a ball nut 262A screwed to the ball screw shaft 261A and supported by the bolster 24, and a motor 263A for rotationally driving the ball screw shaft 261A.

Figure 6:
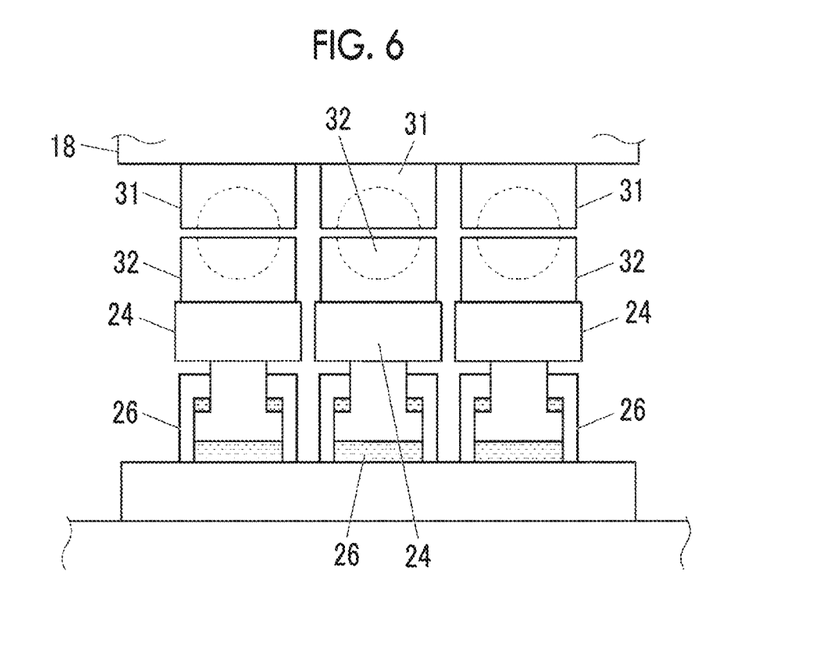
FIG. 6 is a view for describing still another configuration of the pressurizing mechanism.

In addition, as illustrated in the example illustrated in FIG. 6, when the plurality of upper dies 31 (first die and the other first die) and the plurality of lower dies 32 (second die and the other second die) are provided, each of the lower dies 32 may be held by the bolster 24 individually provided, and the plurality of hydraulic cylinders 26 (pressurizing mechanism and the other pressurizing mechanism) individually corresponding to each of the lower dies 32 may be provided.

In this case, each of the hydraulic cylinders 26 may individually pressurize each of the lower dies 32 while pressurizing each of the lower dies 32 toward each of the upper dies 31 in a state where each of the upper dies 31 and each of the lower dies 32 are moved close to each other by the drive unit 10. In this case, each of the hydraulic cylinders 26 may be operated at an individual timing, with an individual pressurizing force, or with an individual stroke.

In this manner, the forming object of each of the lower dies 32 can individually be pressurized and held under different conditions, and more proper molding can be performed. In addition, the pressurizing and holding operation can be performed at the required time and at a timing required for each of the lower dies 32, and energy-saving molding can be performed.

In addition, the drive unit 10 forming the crank mechanism has been described as an example of the reciprocating mechanism. However, other mechanisms may be adopted as long as a larger stroke than that of the pressurizing mechanism can easily be obtained, and the stroke operation can easily be obtained at a higher speed than that of the pressurizing mechanism. For example, instead of the crank mechanism, a pneumatic mechanism using a cam mechanism or a pneumatic cylinder may be adopted.

Alternatively, details in the above-described embodiment can appropriately be changed within the scope not departing from the concept of the invention.

It should be understood that the invention is not limited to the above-described embodiment, but may be modified into various forms on the basis of the spirit of the invention. Additionally, the modifications are included in the scope of the invention.

What is claimed is:

1. A press device comprising:
   a slide configured to hold a first die;
   a holding portion configured to hold a second die;
   a reciprocating mechanism that causes the slide to reciprocate in a stroke direction in which the first die and the second die move closer to or away from each other; and
   a pressurizing mechanism that holds the second die while pressurizing the second die toward the first die with a stroke shorter than that of the reciprocating mechanism in a state where the first die and the second die are moved close to each other by the reciprocating mechanism,
   wherein the reciprocating mechanism is a crank mechanism,
   the crank mechanism is configured to stop the slide by opening a clutch and closing a brake when the slide reaches a bottom dead center,
   the pressurizing mechanism is configured to hold the second die to pressurize the second die toward the first die when the slide is positioned at the bottom dead center, and
   the position of the slide is held with a force smaller than a pressurizing force applied from the pressurizing mechanism while the second die is pressurized and held by the pressurizing mechanism.

2. The press device according to claim 1, wherein the crank mechanism includes an eccentric shaft.

3. The press device according to claim 2, further comprising:
   a movement amount measuring instrument that detects a position of the slide in the stroke direction.

4. The press device according to claim 3, wherein the movement amount measuring instrument is an encoder that detects a rotation angle of the eccentric shaft.

5. The press device according to claim 3, wherein the movement amount measuring instrument is a linear sensor or a laser detector.

6. The press device according to claim 2, wherein the slide is configured to dispose the first die and one or more additional first dies along a longitudinal direction of the eccentric shaft, and
   the holding portion is configured to dispose the second die and one or more additional second dies along the longitudinal direction of the eccentric shaft.

7. The press device according to claim 1, wherein the crank mechanism moves the slide to a position where the second die is pressurized and held by the pressurizing mechanism, and stops the slide.

8. The press device according to claim 7, further comprising:
   a slide holding mechanism that holds a position of the slide while the second die is pressurized and held by the pressurizing mechanism.

9. The press device according to claim 7, wherein the crank mechanism moves the slide to a dead center of a stroke operation, and stops the slide.

10. The press device according to claim 7, wherein the pressurizing mechanism pressurizes and holds the second die while the slide is stopped by the crank mechanism.

11. The press device according to claim 1, wherein the pressurizing mechanism is a cylinder mechanism using a hydraulic pressure.

12. The press device according to claim 11, further comprising:
    a bed having an upper surface to which the holding portion is fixed via the cylinder mechanism,
    wherein the second die is configured to be held in an upper portion of the holding portion.

13. The press device according to claim 12, wherein the cylinder mechanism includes a cylinder fixed to the upper surface of the bed, and a piston accommodated inside the cylinder to be movable in the stroke direction.

14. The press device according to claim 13, wherein the cylinder mechanism further includes a piston rod connected to the piston, and
    the piston rod extends upward, and an upper end portion of the piston rod is fixed to a lower surface of the holding portion.

15. The press device according to claim 12,
wherein the cylinder mechanism includes a piston fixed to the upper surface of the bed, and a cylinder fixed to a lower surface of the holding portion.

16. The press device according to claim 1, further comprising:
a bed that supports the holding portion,
wherein the pressurizing mechanism is a ball screw mechanism including a ball screw shaft supported by the bed to be rotatable in a state along the stroke direction, a ball nut screwed to the ball screw shaft and supported by the holding portion, and a motor that rotationally drives the ball screw shaft.

17. The press device according to claim 1, further comprising:
another pressurizing mechanism other than the pressurizing mechanism,
wherein the slide is configured to hold another first die other than the first die, and the holding portion is configured to hold another second die other than the second die,
the reciprocating mechanism causes the slide to reciprocate in a stroke direction in which the other first die and the other second die move closer to or away from each other, and
the other pressurizing mechanism holds the other second die while pressurizing the second die toward the other first die with a stroke shorter than that of the reciprocating mechanism in a state where the other first die and the other second die are moved close to each other by the reciprocating mechanism.

18. The press device according to claim 17,
wherein the other pressurizing mechanism is configured to perform pressurizing and holding operations independently of the pressurizing mechanism.

* * * * *